United States Patent
Eizumi et al.

(10) Patent No.: US 7,974,172 B2
(45) Date of Patent: Jul. 5, 2011

(54) OPTICAL PICKUP APPARATUS

(75) Inventors: Kiyotaka Eizumi, Oizumi-machi (JP); Minoru Sato, Gunma-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 105 days.

(21) Appl. No.: 12/562,054

(22) Filed: Sep. 17, 2009

(65) Prior Publication Data

US 2010/0067350 A1    Mar. 18, 2010

(30) Foreign Application Priority Data

Sep. 18, 2008   (JP) ................................ 2008-239898
Sep. 30, 2008   (JP) ................................ 2008-252911

(51) Int. Cl.
  *G11B 7/00* (2006.01)
(52) U.S. Cl. ......... 369/109.02; 369/112.03; 369/112.04; 369/112.05; 369/112.07; 369/112.23; 369/124.03; 369/44.37; 369/44.38
(58) Field of Classification Search .................. None
  See application file for complete search history.

(56) References Cited

U.S. PATENT DOCUMENTS

2009/0022032 A1*   1/2009   Kawasaki et al. ........ 369/109.02

FOREIGN PATENT DOCUMENTS

JP   2004-145915   5/2004
JP   2007-220175   8/2007

* cited by examiner

*Primary Examiner* — Joseph Haley
*Assistant Examiner* — Ifedayo Iluyomade
(74) *Attorney, Agent, or Firm* — SoCal IP Law Group LLP; Steven C. Sereboff; John E. Gunther

(57) ABSTRACT

An optical-pickup apparatus comprising: a laser-light source; a diffraction grating including first-and-second regions of periodic structures different in phase from each other and a third region whose periodic structure is different in phase from the first-and-second regions; an objective lens focusing main-and-sub-luminous fluxes generated by the diffraction grating on the same optical-disc track; and a photodetector to receive reflected light of the main-and-sub-luminous fluxes from an optical disc and output a detection signal for generating main-and-sub-push-pull signals, a relationship between an incident light width in the objective lens corresponding to the third region and pupil diameters of the objective lens corresponding to first-and-second wavelengths of laser lights being adjusted so that a ratio of minimum value to maximum value of a differential-push-pull-signal is at substantially 50% or more and a ratio of sub-push-pull-signal level to main-push-pull-signal level is at substantially 15% or more, in both cases of the laser lights.

6 Claims, 8 Drawing Sheets

OPTICAL PICKUP APPARATUS

CROSS-REFERENCE TO RELATED APPLICATION

This application claims the benefit of priority to Japanese Patent Application Nos. 2008-239898 and 2008-252911, filed Sep. 18, 2008 and Sep. 30, 2008, respectively, of which full contents are incorporated herein by reference.

BACKGROUND OF THE INVENTION

1. Field of the Invention

The present invention relates to an optical pickup apparatus.

2. Description of the Related Art

As an optical pickup apparatus compatible with a plurality of types of optical discs different in track pitch, there is known an optical pickup apparatus employing tracking control by an inline differential push-pull method. By the inline push-pull method, laser light emitted from a laser light source is diffracted by a diffraction grating in which regions having periodic structures different in phase from each other are joined, to generate 0th order light and ±1st order diffracted lights. The 0th order light and ±1st order diffracted lights are applied to a recording layer of the optical disc, and reflected lights thereof are received, to generate a main push-pull signal and a sub push-pull signal. Then, by generating a differential push-pull signal to obtain a tracking error signal from the main push-pull signal and the sub push-pull signal, an offset component accompanying displacement of an objective lens or inclination of the optical disc can be effectively reduced. It is known that, in the diffraction grating, by providing a central region having a periodic structure further different in phase between the regions including the periodic structures different in phase from each other, a visual-field characteristic can be improved which indicates a deterioration rate of the differential push-pull signal when the objective lens is displaced in a tracking direction (radial direction of the optical disc) (Japanese Patent Laid-Open Publication No. 2004-145915, for example). Also, there is known an optical pickup apparatus including a laser light source for emitting laser light having a wavelength corresponding to each of the optical discs in order to be compatible with both CD (Compact Disc) and DVD (Digital Versatile Disc)(Japanese Patent Laid-Open Publication No. 2007-220175, for example.)

The ±1st order diffracted lights diffracted by the diffraction grating further becomes reflected lights of the 0th order light and the ±1st order diffracted lights, respectively, by a diffraction function of a land and a groove formed in the recording layer of the optical disc. Then, by the 0th order light and the ±1st order diffracted lights, which are the reflected lights, sub beam spots are formed on a photodetector for generating the sub push-pull signal. In these sub beam spots, lightness of a region where the 0th order light and the +1st order diffracted light overlap and lightness of a region where 0th order light and the −1st order diffracted light overlap change according to a tracking position of the optical pickup apparatus. Then, the sub push-pull signal is generated based on a difference between a detected value on the +1st order side and a detected value on the −1st order side on the photodetector.

In a case where the central region is provided on the diffraction grating as shown in Japanese Patent Laid-Open Publication No. 2004-145915, as shown in FIG. 8, a region with different lightness having a width D corresponding to the central region of the diffraction grating is generated at the center of the 0th order light forming the sub beam spot. Therefore, if the width D in the 0th order light is too great, a signal level of the sub push-pull signal becomes small, and a SN ratio (Signal to Noise Ratio) of the sub push-pull signal may be lowered. Particularly in the case of being compatible with both CD and DVD, it is required to satisfy a required level on a visual-field characteristic as well as suppress lowering of the SN ratio of the sub push-pull signal, for both the optical discs.

SUMMARY OF THE INVENTION

An optical pickup apparatus according to an aspect of the present invention, comprises: a laser light source configured to selectively emit laser light with a first wavelength and laser light with a second wavelength, the first and second wavelengths being different from each other; a diffraction grating including first and second regions of periodic structures different in phase from each other and a third region which is disposed between the first and second regions and of which a periodic structure is different in phase from the first and second regions, the diffraction grating being configured to diffract the laser light to generate a main luminous flux and a sub luminous flux; an objective lens configured to focus the main luminous flux and the sub luminous flux generated by the diffraction grating on the same track of an optical disc; and a photodetector configured to receive reflected light of the main luminous flux and the sub luminous flux focused on the optical disc, and output a detection signal for generating a main push-pull signal and a sub push-pull signal, a relationship between a width of incident light incident on the objective lens corresponding to the third region, and pupil diameters of the objective lens corresponding to the first and second wavelengths being adjusted so that a ratio of a minimum value to a maximum value of a signal level of a differential push-pull signal generated from the main push-pull signal and the sub push-pull signal is substantially 50% or more, and a ratio of a signal level of the sub push-pull signal to a signal level of the main push-pull signal is substantially 15% or more, in both cases of the laser lights with the first and second wavelengths.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
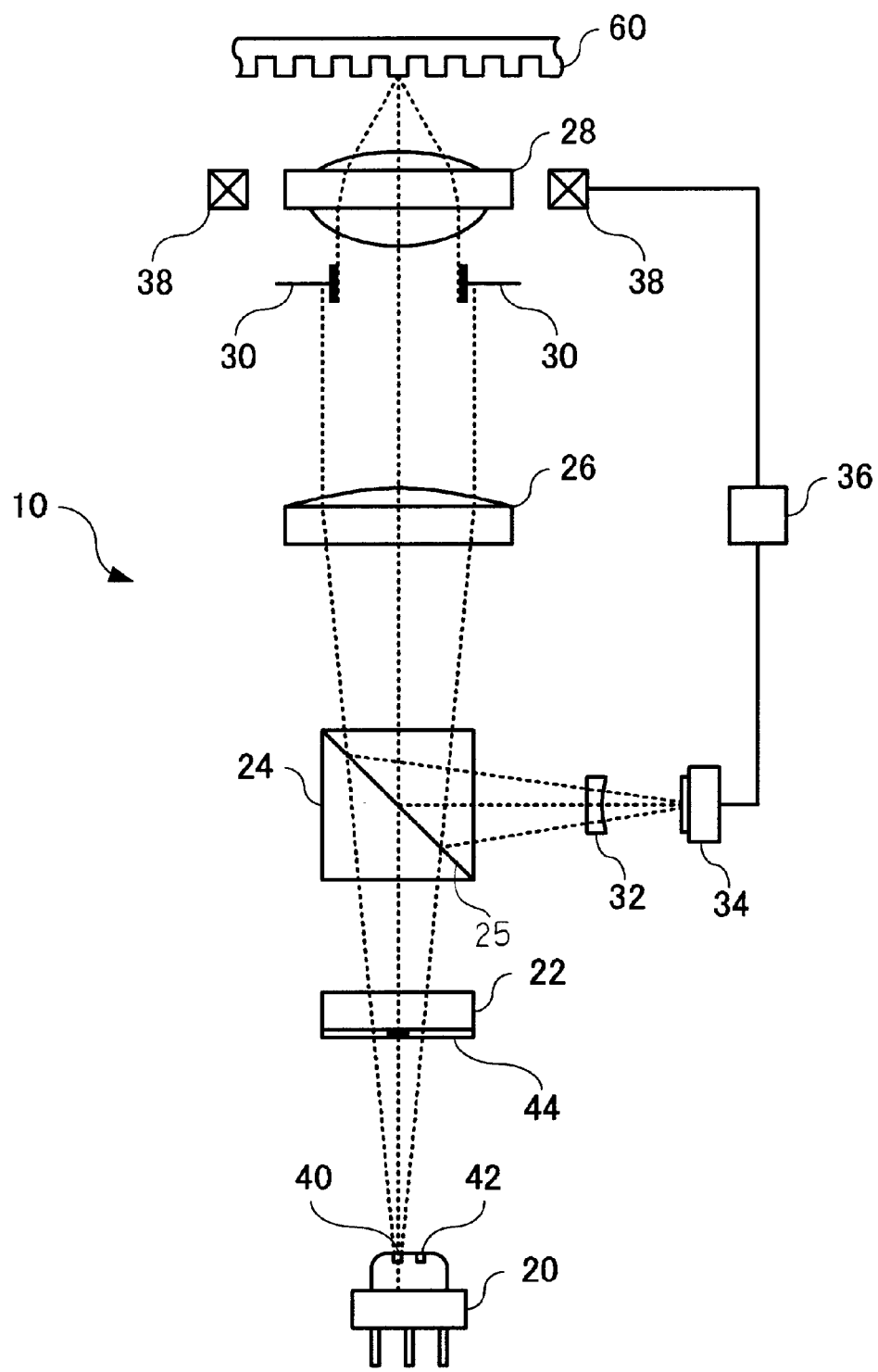
FIG. 1 is a diagram illustrating an optical pickup apparatus according to an embodiment of the present invention.

FIG. 1 is a diagram illustrating an optical pickup apparatus according to an embodiment of the present invention. An optical pickup apparatus 10 includes a laser light source 20, a diffraction grating 22, a beam splitter 24, a collimating lens 26, an objective lens 28, an aperture (diaphragm) 30, a sensor lens 32, a photodetector 34, a driving-signal generation unit 36, and an objective-lens driving unit 38.

The laser light source 20 includes a laser diode in which a light emitting point 40 of laser light having a wavelength for DVD (first wavelength) and a light emitting point 42 of laser light having a wavelength for CD (second wavelength) are provided with a predetermined space therebetween and is a multi laser unit selectively emitting laser lights with two wavelengths suitable for recording/reproduction for CD and recording/reproduction for DVD with a single laser unit. Here, the wavelength for DVD is about 630 to 685 nm, and the wavelength for CD is about 765 to 839 nm. In an embodiment according to the present invention, the laser light source 20 is disposed such that an optical axis of the laser light for DVD emitted from the light emitting point 40 passes through substantially the center of a grating face 44 of the diffraction grating 22.

Figure 2:
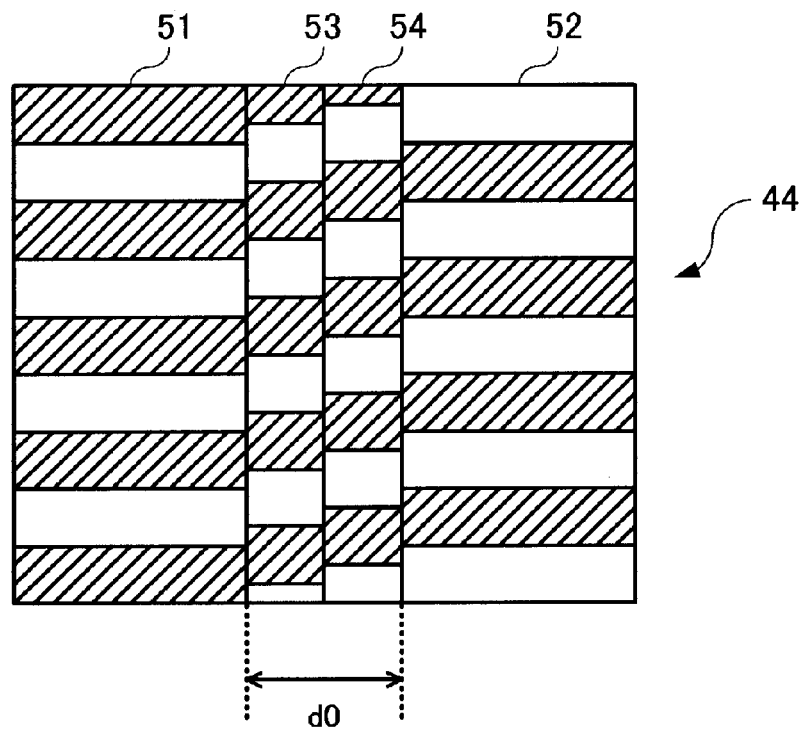
FIG. 2 is a diagram illustrating an example of a grating face of a diffraction grating.

The diffraction grating 22 includes a grating face 44 for generating 0th order light (main luminous flux) and ±1st order diffracted lights (sub luminous flux) used in the inline differential push-pull method from the laser light emitted from the laser light source 20. FIG. 2 is a diagram illustrating an example of the grating face 44. On the grating face 44, there are provided a region 51 (first region) and a region 52 (second region) for generating a phase shift of 180 degrees in a part of the laser light emitted from the laser light source 20. Specifically, the substantially rectangular regions 51 and 52 include periodic structures each of which has a recess and a projection repeated and which are different in phase from each other by 180 degrees. In a central region between the regions 51 and 52 on the grating face 44, there are provided regions 53 and 54 (third region) having periodic structures different in phase from the regions 51 and 52. Specifically, the periodic structure of the region 53 is different in phase by 60 degrees with respect to the periodic structure of the region 51, while the periodic structure of the region 54 is different in phase by 120 degrees and 60 degrees with respect to the periodic structures of the regions 51 and 53, respectively. A width of the central region including the regions 53 and 54 is referred to as d0.

The beam splitter 24 includes a filter film 25 which allows the 0th order light and ±1st order diffracted lights having passed through the diffraction grating 22 to pass therethrough toward the collimating lens 26 and reflects reflected lights reflected by an optical disc 60 in a direction of the sensor lens 32. The collimating lens 26 converts the 0th order light and ±1st order lights, which are diffused lights having passed through the beam splitter 24, into parallel lights.

The objective lens 28 focuses the parallel lights from the collimating lens 26, to form irradiation spots respectively corresponding to the 0th order light and ±1st order lights onto a recording layer (signal surface) of the optical disc 60. On an incident surface of the objective lens 28, there is formed a diffraction structure for focusing the laser light for DVD onto the recording layer of the optical disc 60 of DVD and the laser light for CD onto a recording layer of the optical disc 60 of CD, and thus, the laser lights for DVD and CD are respectively focused on the recording layers of the optical discs 60 at a suitable irradiation spot capable of recording/reproduction with respect to the optical discs 60.

The reflected lights from the recording layer of the optical disc 60 return to the collimating lens 26 through the objective lens 28.

The aperture 30 is used for setting a pupil diameter which is the maximum diameter of incident light incident on the objective lens 28 when the optical disc 60 is a DVD. When the optical disc 60 is a CD, a diffraction structure provided on the incident surface of the objective lens 28 also functions as an aperture of laser light for CD, and a pupil diameter of the CD is set by the diffraction structure. Since a track pitch of DVD is narrower than that of CD in general, a spot diameter of the irradiation spot needs to be reduced. The spot diameter of the irradiation spot formed on the recording layer of the optical disc 60 is in proportion to a wavelength of the laser light, and in inverse proportion to the pupil diameter of the objective lens 28. Thus, the pupil diameter of DVD set by the aperture 30 is greater than the pupil diameter of CD.

The sensor lens 32 adds astigmatism for focusing to the reflected light reflected by the beam splitter 24. The photodetector 34 includes a plurality of light receiving portions and receives the reflected light with each of the receiving portions through the sensor lens 32, so that each of the light receiving portions outputs a detection signal at a level corresponding to a light amount of the above received reflected light. The driving-signal generation unit 36 generates a tracking error signal and a focusing error signal based on respective detection signal from the light receiving portions of the photodetector 34. The objective-lens driving unit 38 drives the objective lens 28 in a tracking direction or a focusing direction based on the tracking error signal and the focusing error signal from the driving-signal generation unit 36.

Figure 3:
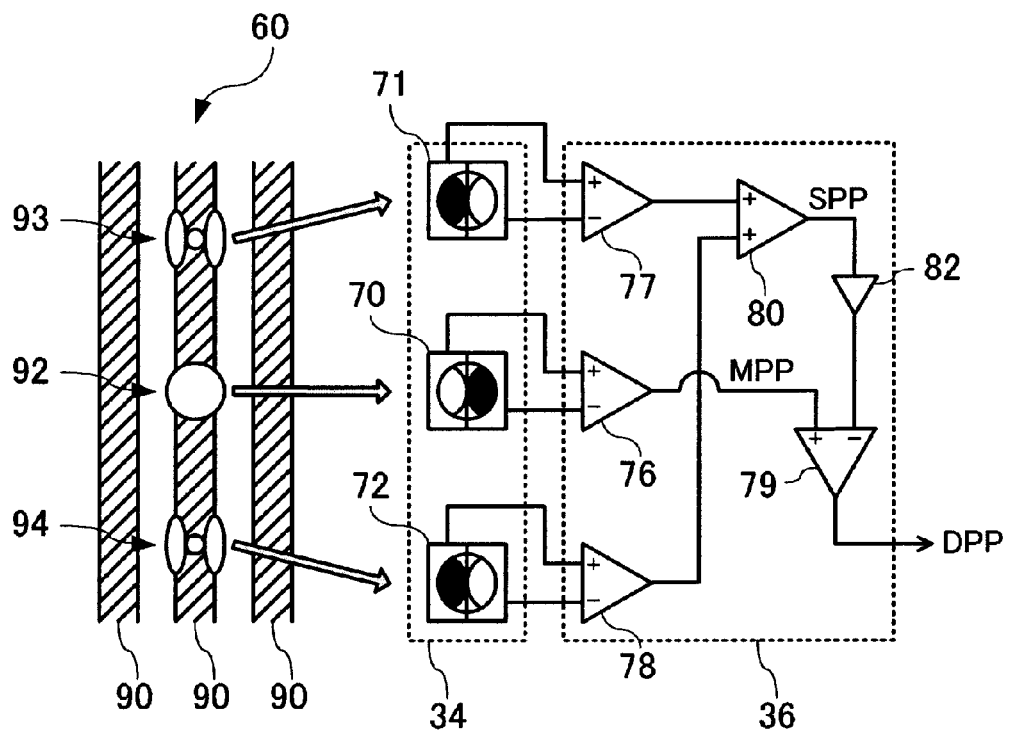
FIG. 3 is a diagram illustrating a configuration example of a part of a photodetector and a driving-signal generation unit.

FIG. 3 is a diagram illustrating a configuration example of apart of the photodetector 34 and the driving-signal generation unit 36. The photodetector 34 includes light receiving portions 70 to 72 for DVD. The driving-signal generation unit 36 includes subtractors 76 to 79, an adder 80, and an amplifier 82. An irradiation spot 92 formed by irradiation with the 0th order light and irradiation spots 93 and 94 formed by irradiation with the ±1st order diffracted lights are on the same track 90 of the optical disc 60. The reflected lights from the irradiation spots 92 to 94 becomes the 0th order light and ±1st order diffracted lights, respectively, by a diffraction function of the optical disc 60, to be applied to the light receiving portions 70 to 72. The light receiving portions 70 to 72 each has a light receiving surface divided into two parts, for example, and a difference in light receiving amount is produced between two parts of each light receiving surface according to positional relationship between the track 90 and the irradiation spots 92 to 94.

The subtractor 76 performs an arithmetic operation to obtain a difference in light receiving amount between the two light receiving surfaces in the light receiving portion 70, thereby generating a main push-pull signal (MPP). The subtractors 77 and 78 perform arithmetic operations to obtain a difference in light receiving amount between the two light receiving surfaces in the light receiving portions 71 and 72, respectively. Then, signals with the same phase from the subtractors 77 and 78 are added at the adder 80, and the sub push-pull signal (SPP) is generated. The main push-pull signal (MPP) and the sub push-pull signal (SPP) are opposite in phase, and the sub push-pull signal (SPP) amplified at the amplifier 82 is subtracted from the main push-pull signal (MPP) at the subtractor 79, so as to obtain a differential push-pull signal (DPP) to become a tracking error signal.

Here, the offset component, which are generated in the main push-pull signal (MPP) and the sub push-pull signal (SPP) due to displacement of the objective lens 28, inclination of the optical disc 60 and the like, are the same in phase regardless of the positions of the irradiation spots 92 to 94. Therefore, the offset component contained in the tracking error signal can be effectively reduced by means of the subtraction at the subtractor 79.

Though FIG. 3 illustrates only the light receiving portions 70 to 72 for DVD, the photodetector 34 also includes light receiving portions for CD (not shown), and the differential push-pull signal (DPP) in which the offset component is reduced is similarly generated in a case of CD as well.

In order to suppress lowering of an SN ratio of the sub push-pull signal (SPP), the sub push-pull signal (SPP) is required to be greater in signal level (amplitude) to some extent. In general, the signal level of the sub push-pull signal (SPP) is required to be 15% or more of the signal level of the main push-pull signal (MPP).

Figure 4:
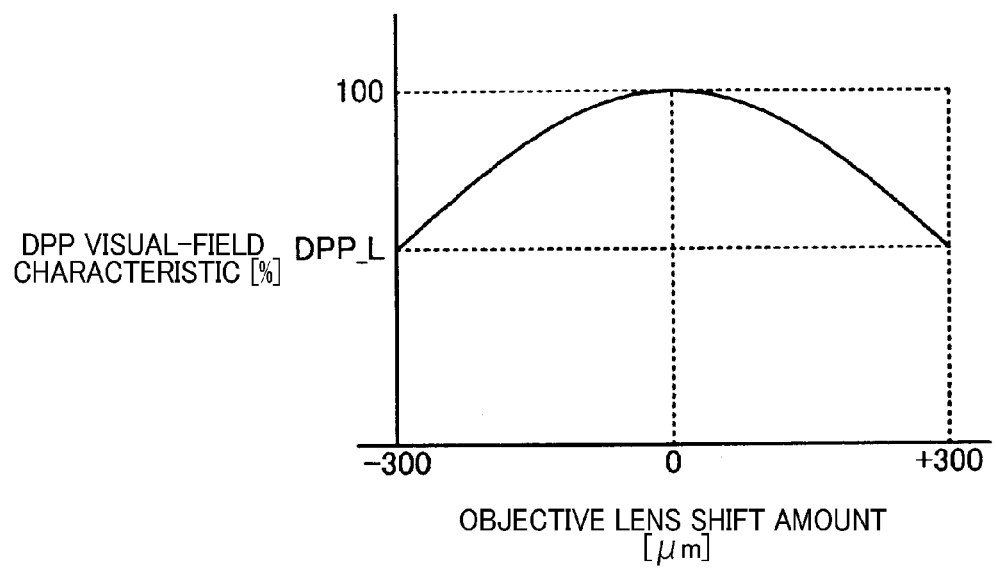
FIG. 4 is a diagram illustrating an example of a visual-field characteristic of a differential push-pull signal.

FIG. 4 is a graph illustrating an example of a visual-field characteristic of the differential push-pull signal (DPP). It is assumed that a shift amount in the tracking direction of the objective lens 28 is ±300 μm, for example. In this case, generally, the signal level of the differential push-pull signal (DPP) becomes the maximum at the center point of the shift amount of the objective lens, and as the shift amount is increased in a positive direction or a negative direction from the center point, the differential push-pull signal (DPP) becomes smaller in signal level. The visual-field characteristic of the differential push-pull signal (DPP) indicates a rate of degradation of the differential push-pull signal (DPP) caused by a shift of the objective lens 28, and is expressed by a ratio (%) to the maximum value of the signal level. For example, in a case where the differential push-pull signal (DPP) becomes the maximum when the shift amount of the objective lens is at the center position, the visual-field characteristic becomes the lowest value (DPP_L) when the shift amount is +300 μm or −300 μm, in general. The lowest value (DPP_L) of the visual-field characteristic is required to be 50% or more as an index in order to carry out tracking accurately, in general.

Figure 5:
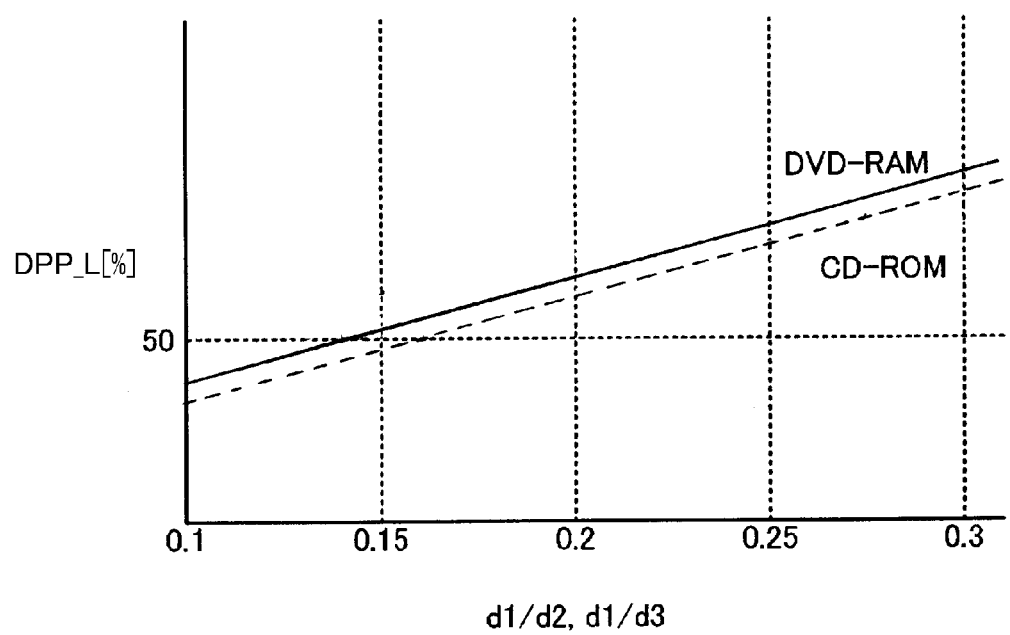
FIG. 5 is a graph illustrating an example of a change of a lowest value of a visual-field characteristic in an optical pickup apparatus.
Figure 6:
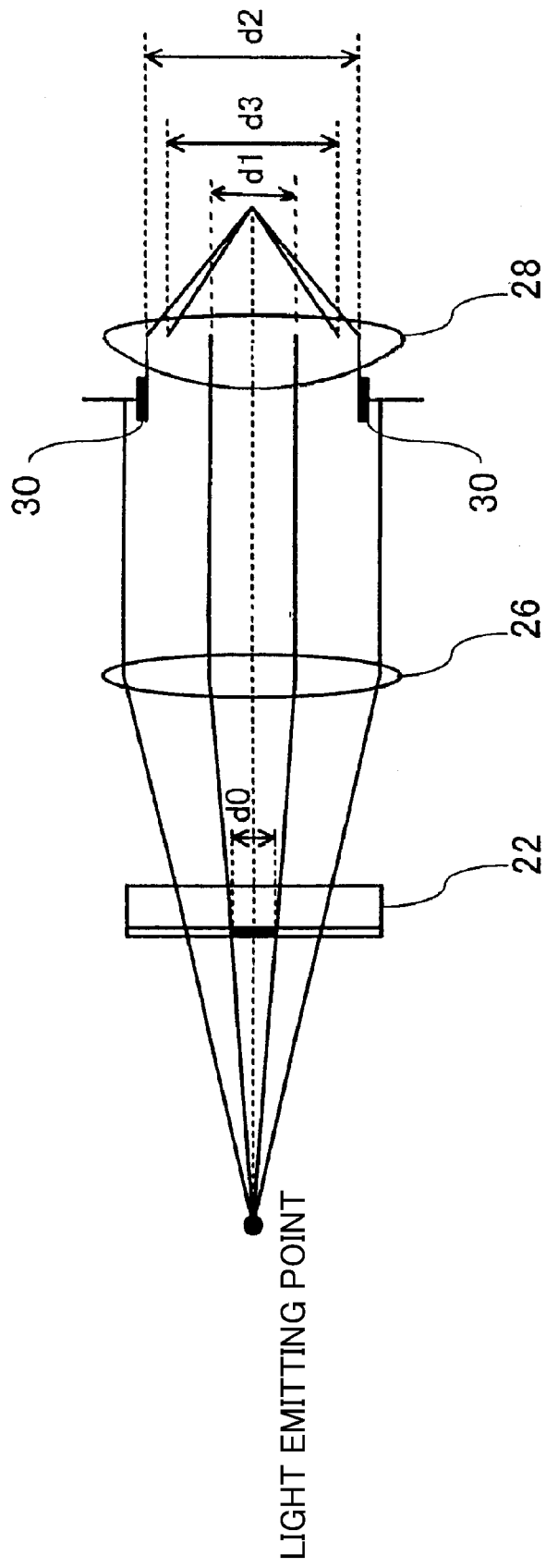
FIG. 6 is a diagram illustrating d0 to d3 in an optical pickup apparatus of FIG. 1.

FIG. 5 is a graph illustrating an example of a change of the lowest value (DPP_L) of the visual-field characteristic in the optical pickup apparatus 10. As shown in FIG. 6, a width of light is referred to as d1 which has a phase corresponding to the central region of the width d0 in the diffraction grating 22 out of the incident light incident on the objective lens 28. The pupil diameter in the case of DVD is referred to as d2 which is adjusted by the aperture 30, and the pupil diameter in the case of CD is referred to as d3 which is adjusted by the aperture function of the diffraction structure of an objective lens 28.

Figure 8:
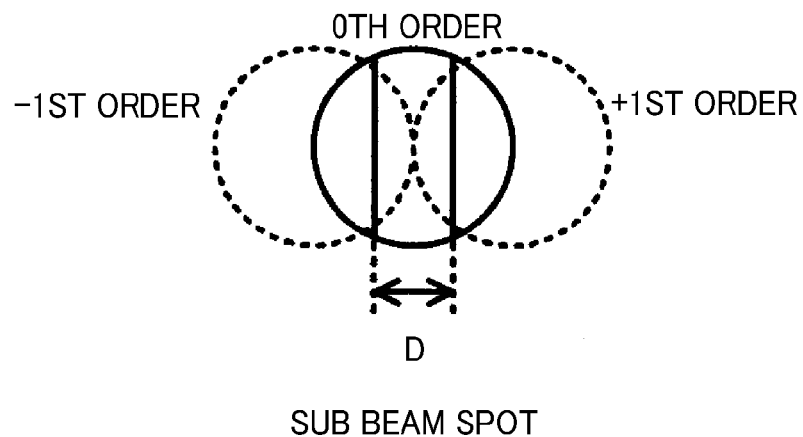
FIG. 8 is a diagram illustrating an example of a sub beam spot.

In the graph in FIG. 5, the horizontal axis indicates d1/d2 in the case of DVD and d1/d3 in the case of CD, and the vertical axis indicates the lowest value (DPP_L) of the visual-field characteristic. A solid line indicates the case of DVD-RAM, while a broken line indicates the case of CD-ROM. In both cases of the DVD-RAM and CD-ROM, as d1/d2 or d1/d3 becomes greater, the lowest value (DPP_L) of the visual-field characteristic also becomes greater. In FIG. 3, when the signal levels of the differential push-pull signal (DPP), the main push-pull signal (MPP), and the sub push-pull signal (SPP) are expressed as DPP, MPP, SPP, respectively, and a gain of the amplifier 82 is expressed as G, DPP=MPP−G×SPP. Moreover, as shown in FIG. 8, a width D in the sub beam spot formed on the light receiving surface of the photodetector 34 corresponds to the width d1 of the incident light in the objective lens 28. As the width d1 becomes greater, the signal level of the sub push-pull signal (SPP) becomes smaller. When the signal level of the sub push-pull signal (SPP) becomes smaller, a rate becomes smaller which is contributed by the sub push-pull signal (SPP) in a relation of DPP=MPP−G×SPP, and thus, the deterioration rate of the differential push-pull signal (DPP) also becomes smaller and consequently the lowest value (DPP_L) of the visual-field characteristic becomes greater. That is, the lowest value (DPP_L) of the visual-field characteristic can be increased by increasing the width d0 of the central region of the diffraction grating 22 so as to increase the width d1 of the incident light in the objective lens 28, for example.

Figure 7:
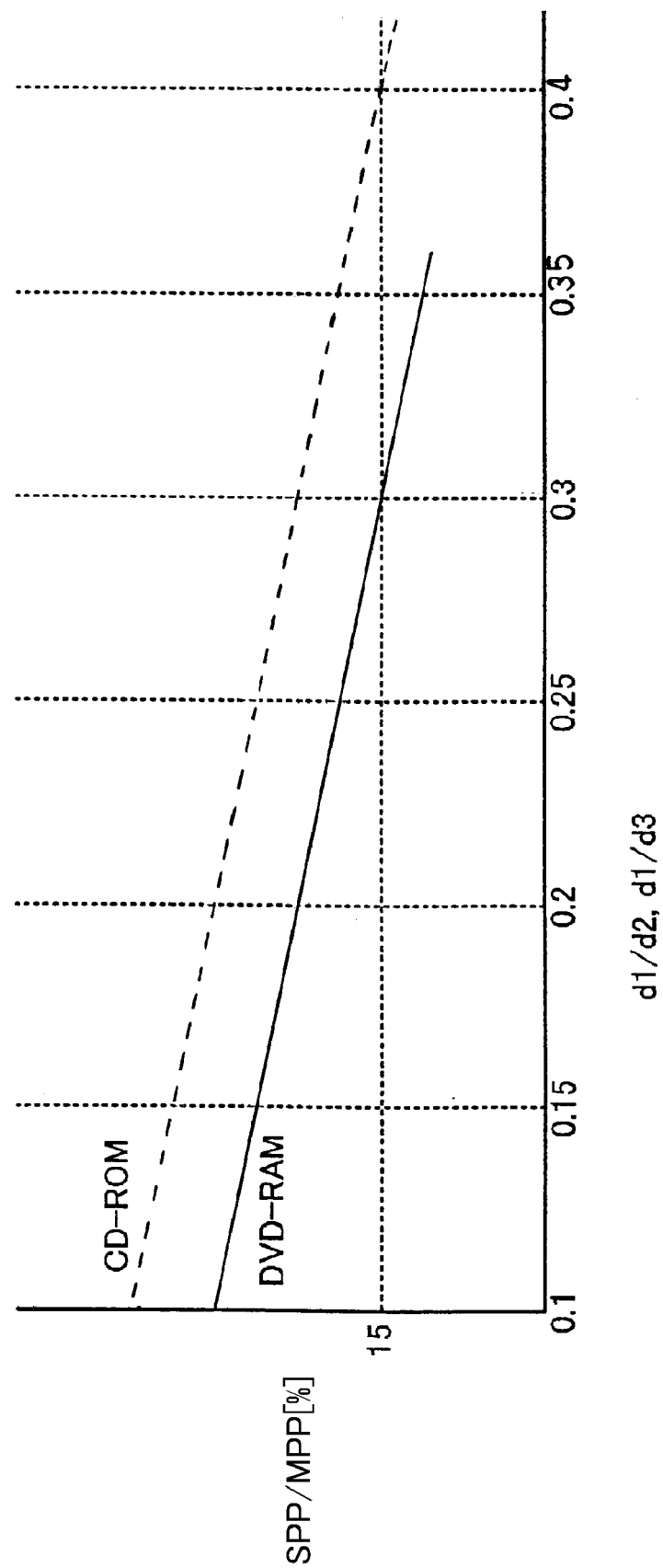
FIG. 7 is a graph illustrating an example of a change in a rate of a sub push-pull signal to a main push-pull signal in an optical pickup apparatus.

FIG. 7 is a graph illustrating an example of a change in a rate of the sub push-pull signal (SPP) to the main push-pull signal (MPP) in the optical pickup apparatus 10. In the graph in FIG. 7, the horizontal axis indicates d1/d2 in the case of DVD and d1/d3 in the case of CD, and the vertical axis indicates a rate (SPP/MPP) of the signal level of the sub push-pull signal (SPP) to that of the main push-pull signal (MPP). The solid line indicates the case of DVD-RAM, while the broken line indicates the case of CD-ROM. In both cases of DVD-RAM and CD-ROM, as d1/d2 or d1/d3 becomes greater, SPP/MPP becomes smaller. That is because the width D in the sub beam spot exemplified in FIG. 8 becomes greater as the width d1 becomes greater, and accordingly, the signal level of the sub push-pull signal (SPP) is lowered.

Referring to the graphs in FIGS. 5 and 7, as d1/d2 or d1/d3 becomes greater, DPP_L becomes greater, while SPP/MPP becomes smaller. In the optical pickup apparatus 10, DPP_L is required to be 50% or more in order to perform the tracking accurately, and SPP/MPP is required to be 15% or more in order to suppress the lowering of the SN ratio of the sub push-pull signal (SPP). Therefore, in the optical pickup apparatus 10 according to an embodiment of the present invention, d1/d2 and d1/d3 are adjusted within such a range that DPP_L is 50% or more and SPP/MPP is 15% or more based on the graphs in FIGS. 5 and 7. Specifically, in the examples of the graphs in FIGS. 5 and 7, since an adjustment is made to satisfy 0.14<d1/d2<0.30 and 0.16<d1/d3<0.40, DPP_L can become 50% or more and SPP/MPP can become 15% or more in both cases of DVD and CD. As a result of this, in the optical pickup apparatus 10, an offset component contained in the tracking signal can be effectively reduced, and the required level of the visual-field characteristic can be satisfied.

Adjustments of d1/d2 and d1/d3 can be realized by adjusting d1 or adjusting d2 and d3, for example. However, d2 and d3, which are the pupil diameters, are difficult to be adjusted in many cases since they affect the spot diameter of an irradiation spot formed on the optical disc 60. Moreover, the width d1 of the incident light of the objective lens 28 is determined by the width d0 of the central region in the diffraction grating 22 and positional relationship between the diffraction grating 22 and the collimating lens 26, however, positional relationship of optical elements in the optical pickup apparatus 10 is determined by other requirements in optical design, and thus, a degree of flexibility is small. Therefore, in the optical pickup apparatus 10, there is employed the diffraction grating 22 with the width d0 of the central region adjusted so as to satisfy 0.14<d1/d2<0.30 and 0.16<d1/d3<0.40. As a result of this, an adjustment of the pupil diameters or an adjustment of the positional relationship of the optical elements are given higher priority than other requirements in the optical design, and thus, the lowering of the SN ratio of the sub push-pull signal can be suppressed and the required level of the visual-field characteristic can be satisfied.

Figure 9:
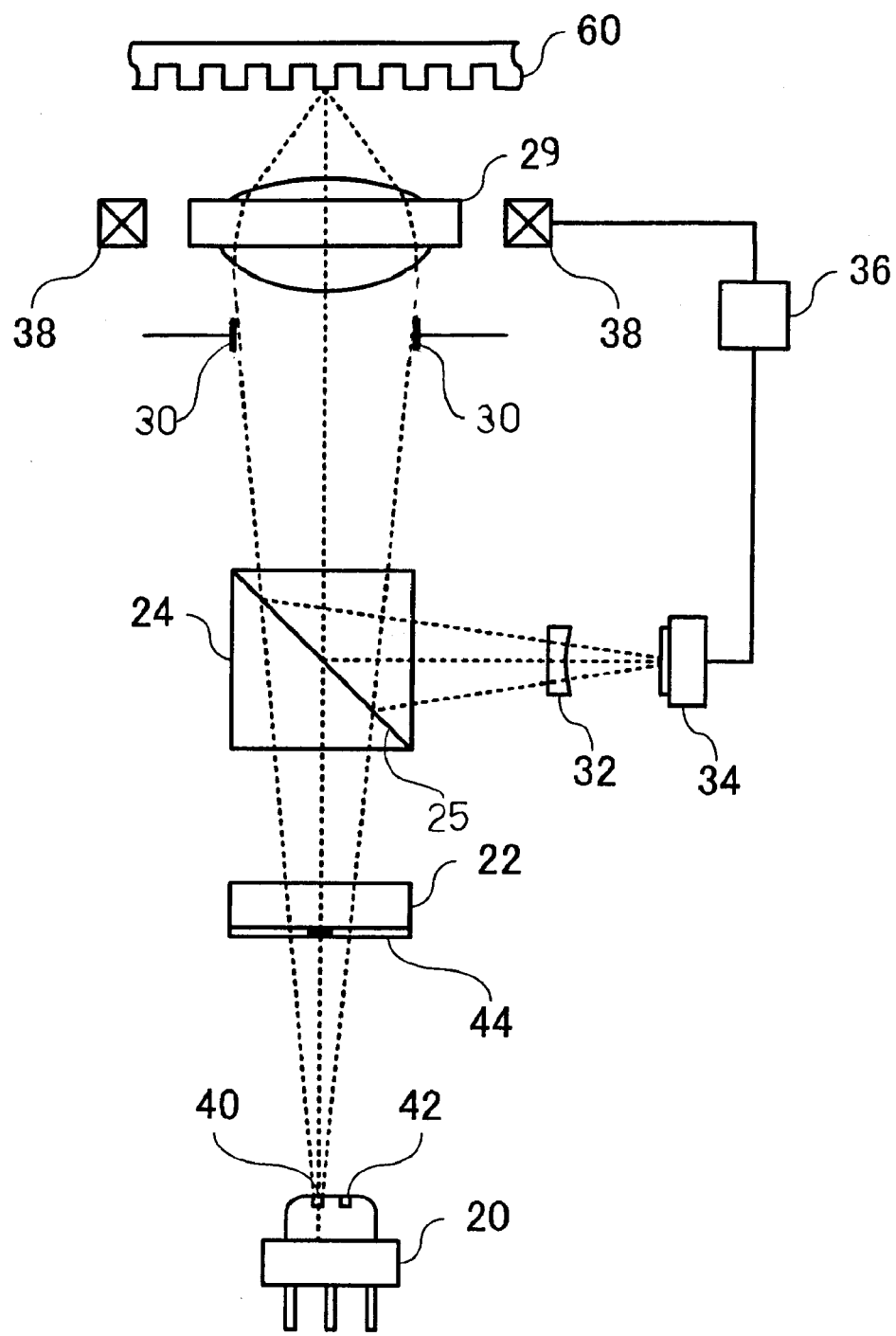
FIG. 9 is a diagram illustrating an optical pickup apparatus according to another embodiment of the present invention.

FIG. 9 is a diagram illustrating an optical pickup apparatus according to another embodiment of the present invention. The optical pickup apparatus 10 described with reference to the above FIG. 1 is an infinite optical system in which the collimating lens 26 is interposed, however, the optical pickup apparatus in FIG. 9 has a configuration in which the collimating lens 26 is omitted from the optical pickup apparatus 10 in FIG. 1 and includes a finite optical system in which diffused laser light from the laser light source 20 is incident on the objective lens 29 through the diffraction grating 22 and the beam splitter 24. In FIG. 9, optical components and optical circuits equivalent to those in FIG. 1 are designated by the same reference numerals.

The laser light emitted from the laser light source 20 is divided into a main luminous flux of the 0th order light and a sub luminous flux of ±1st order diffracted lights by being diffracted by the diffraction grating 22, and thereafter, the divided laser light passes through the filter film 25 of the beam splitter 24 to be applied to the objective lens 29. On an incident surface of the objective lens 29, in the same manner as the objective lens 28 in FIG. 1, there is formed a diffraction structure for focusing the laser light for DVD onto the recording layer of the optical disc 60 of DVD and the laser light for CD onto the recording layer of the optical disc 60 of CD.

In the case of the optical disc 60 of DVD, a pupil diameter of the laser light for DVD incident on the objective lens 29 is set by the aperture 30, and in the case of the optical disc 60 of CD, the pupil diameter of the laser light for CD incident on the objective lens 29 is set by the aperture function of the diffraction structure provided on the incident surface of the objective lens 29.

Therefore, in a case where the laser light for DVD is emitted from the laser light source 20 and the laser light for DVD is incident on the objective lens 29, the laser light is focused with an NA suitable for DVD such as NA 0.65 by the objective lens 29 to be applied to the recording layer of the DVD.

On the other hand, in a case where the laser light for CD is emitted from the laser light source 20 and the laser light for CD is incident on the objective lens 29, the laser light is focused with an NA suitable for CD such as NA 0.51 by the objective lens 29 to be applied to the recording layer of the CD.

The laser light reflected by the recording layer of the optical disc 60 of DVD or CD is returned to the objective lens 29, travels through an optical path in a direction opposite to a direction in which the light travels to the optical disc 60, and is returned to the beam splitter 24. The laser light returned to the beam splitter 24 is reflected by the filter film 25 of the beam splitter 24 and received by the photodetector 34 through the sensor lens 32.

Figure 10:
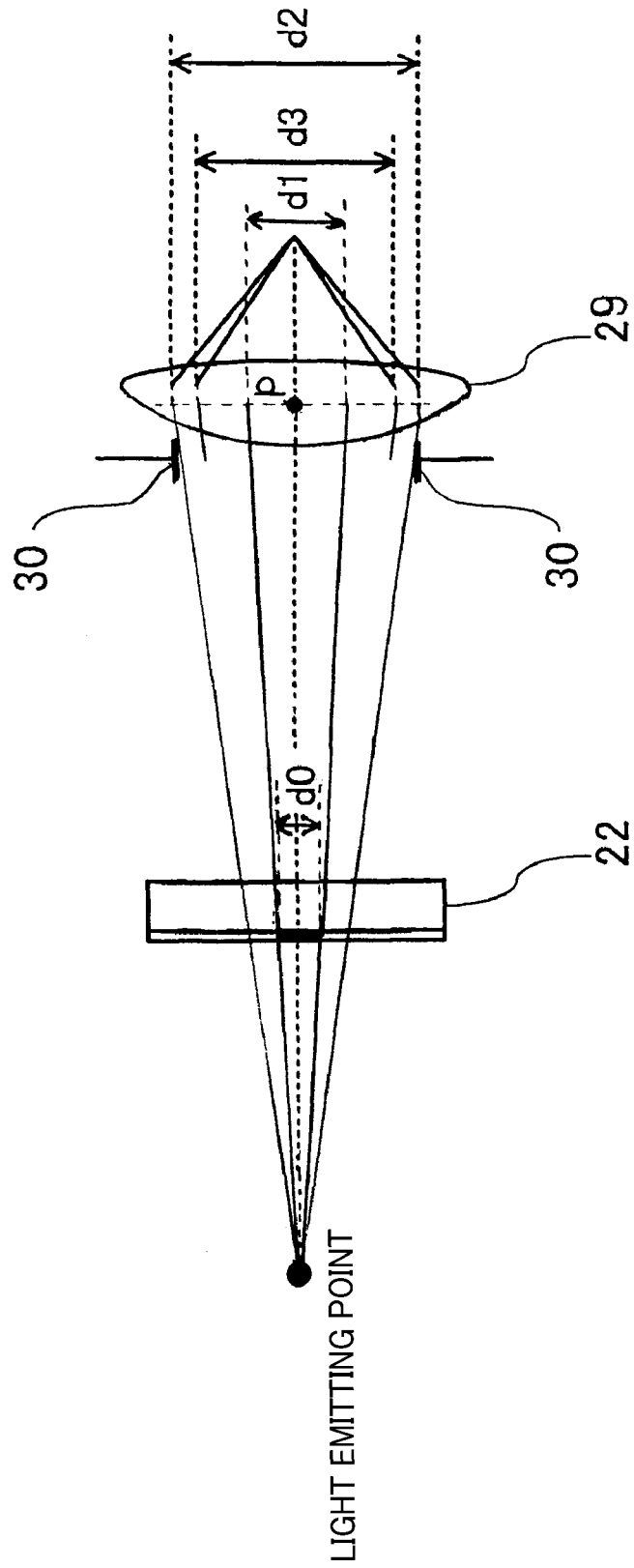
FIG. 10 is a diagram illustrating d0 to d3 in an optical pickup apparatus of FIG. 9.

In the optical pickup apparatus in FIG. 9, as in the same case with the optical pickup apparatus in FIG. 1, a width of the light is referred to as d1 which has the phase corresponding to the central region of the width d0 in the diffraction grating 22 out of the incident light incident on the objective lens 29, the pupil diameter in the case of DVD is referred to as d2 which is adjusted by the aperture 30, and the pupil diameter in the case of CD is referred to as d3 which is adjusted by the aperture function of the diffraction structure of the objective lens 29, as shown in FIG. 10.

Here, the width d1 of the incident light incident on the objective lens 29 is set using a front-side principal point p on the incident surface side of the objective lens 29 as a reference position, and is set as a width of the incident light of the objective lens 29 on a straight line passing through the front-side principal point p orthogonally intersecting the optical axis of the objective lens 29.

Assuming that a center thickness of the objective lens 29 is d, a refractive index is n, a curvature on an incident side of the laser light on a left side on a paper, and a curvature on an emitting side of the laser light on a right side on the paper is r2, the front-side principal point p is defined as $$p = \frac{r1d}{n(r2-r1)+(n-1)d}$$

As shown in FIG. 10, when the width of the incident light incident on the objective lens 29 is referred to as d1, the pupil diameter of the laser light for DVD as d2, and the pupil diameter of the laser light for CD as d3, the lowest value (DPP_L) of the visual-field characteristic corresponding to the shift amount of the objective lens 29 in the tracking direction exhibits the characteristic shown in FIG. 5, and the rate (SPP/MPP) of the signal level of the sub push-pull signal (SPP) to that of the main push-pull signal (MPP) exhibits the characteristic shown in FIG. 7, as in the case with the optical pickup apparatus in FIG. 1.

When requirements of the design of the optical pickup apparatus is that the DPP_L is 50% or more in order to perform tracking accurately and SPP/MPP is 15% or more in order to suppress the lowering of the SN ratio of the sub push-pull signal (SPP), d1/d2 and d1/d3 are adjusted within such a range that DPP_L is 50% or more and SPP/MPP is 15% or more based on the graphs in FIGS. 5 and 7 in the optical pickup apparatus according to an embodiment of the present invention. Specifically, in the examples in the graphs of FIGS. 5 and 7, DPP_L can become 50% more and SPP/MPP can become 15% or more in both cases of DVD and CD by making such an adjustment as 0.14<d1/d2<0.30 and 0.16<d1/d3<0.40. As a result, in the optical pickup apparatus, the offset component contained in the tracking signal can be effectively reduced, and the required level of the visual-field characteristic can be satisfied.

The adjustment of d1/d2 and d1/d3 can be realized by adjusting d1 or adjusting d2 and d3, for example. The width d1 of the incident light of the objective lens 29 is determined by the width d0 of the central region in the diffraction grating 22, a disposed position of the diffraction grating 22, and the distance between the laser light source 20 and the objective lens 29. However, the positional relationship of the optical elements cannot be independently determined to adjust d1/d2 and d1/d3 since the positional relationship thereof is related to other requirements in the optical design. Thus, in the optical pickup apparatus 10, there is employed the diffraction grating 22 having the width d0 of the central region adjusted. As a result, the adjustment of the pupil diameters and the adjustment of the positional relationship of the optical elements are given higher priority than other requirements in the optical design, and therefore, the lowering of the SN ratio of the sub push-pull signal can be suppressed, and the required level of the visual-field characteristic can be satisfied.

The above embodiments of the present invention are simply for facilitating the understanding of the present invention and are not in anyway to be construed as limiting the present invention. The present invention may variously be changed or altered without departing from its spirit and encompass equivalents thereof.

For example, in the examples shown in FIGS. 5 and 7, a condition for rendering DPP_L at 50% or more and SPP/MPP at 15% or more, is set as 0.14<d1/d2<0.30 and 0.16<d1/d3<0.40; however, the range of d1/d2 and d1/d3 satisfying the condition of DPP_L and SPP/MPP is changed according to the positional relationship of the optical elements or the like, and thus, it is not limitative.

Moreover, in an embodiment according to the present invention, the central region of the diffraction grating 22 includes the two regions 53 and 54 different in phase from each other, for example, however, it is not limitative as long as the central region is provided to improve the visual-field characteristic, and the central region of the diffraction grating 22 may include a single region having the periodic structure different in phase from those of the regions 51 and 52.

Furthermore, in an embodiment according to the present invention, an example is shown in which a multi laser unit for selectively emitting laser lights having two wavelengths for CD and DVD is employed as the laser light source 20, however, this is not limitative, and a three-wavelength multi laser unit for selectively emitting laser light having a blue-violet wavelength band of 400 to 420 nm for BD (Blu-ray Disc) in addition to those for CD and DVD is employed as a single laser unit.

What is claimed is:

1. An optical pickup apparatus comprising:
a laser light source configured to selectively emit laser light with a first wavelength and laser light with a second wavelength, the first and second wavelengths being different from each other;
a diffraction grating including first and second regions of periodic structures different in phase from each other and a third region which is disposed between the first and second regions and of which a periodic structure is different in phase from the first and second regions, the diffraction grating being configured to diffract the laser light to generate a main luminous flux and a sub luminous flux;
an objective lens configured to focus the main luminous flux and the sub luminous flux generated by the diffraction grating on the same track of an optical disc; and
a photodetector configured to receive reflected light of the main luminous flux and the sub luminous flux focused on the optical disc, and output a detection signal for generating a main push-pull signal and a sub push-pull signal,
a relationship between a width of incident light incident on the objective lens corresponding to the third region, and pupil diameters of the objective lens corresponding to the first and second wavelengths being adjusted so that
a ratio of a minimum value to a maximum value of a signal level of a differential push-pull signal generated from the main push-pull signal and the sub push-pull signal is substantially 50% or more, and
a ratio of a signal level of the sub push-pull signal to a signal level of the main push-pull signal is substantially 15% or more,
in both cases of the laser lights with the first and second wavelengths.

2. The optical pickup apparatus according to claim 1, wherein
the width of the incident light incident on the objective lens is adjusted by a width of the third region of the diffraction grating.

3. The optical pickup apparatus according to claim 1, wherein
the width of the incident light incident on the objective lens is set relative to a front-side principal point of the objective lens as a reference position.

4. The optical pickup apparatus according to claim 2, further comprising
a collimating lens provided between the diffraction grating and the objective lens, the collimating lens being configured to convert diffused laser light emitted from the laser light source into parallel light, wherein
the width of the incident light incident on the objective lens is adjusted by the collimating lens.

5. The optical pickup apparatus according to claim 1, wherein
the third region includes at least two regions including periodic structures different in phase from each other.

6. An optical pickup apparatus comprising:
a laser light source configured to selectively emit laser light with a first wavelength and laser light with a second wavelength, the first and second wavelengths being different from each other;
a diffraction grating including first and second regions of periodic structures different in phase from each other and a third region which is disposed between the first and second regions and of which a periodic structure is different in phase from the first and second regions, the diffraction grating being configured to generate a main luminous flux and a sub luminous flux from the laser light;
a collimating lens configured to convert the diffused main luminous flux and sub luminous flux into parallel light;
an objective lens configured to focus the main luminous flux and the sub luminous flux output from the collimating lens on the same track of an optical disc; and
a photodetector configured to receive reflected light of the main luminous flux and the sub luminous flux focused on the optical disc, and generate a main push-pull signal and a sub push-pull signal,
a relationship between a width of light corresponding to the third region in the parallel light, and pupil diameters of the objective lens corresponding to the first and second wavelengths being adjusted so that
a ratio of a minimum value to a maximum value of a signal level of a differential push-pull signal generated from the main push-pull signal and the sub push-pull signal is substantially 50% or more, and
a ratio of a signal level of the sub push-pull signal to a signal level of the main push-pull signal is substantially 15% or more,
in both cases of the laser lights with the first and second wavelengths.

* * * * *